United States Patent [19]

Tsuji

[11] 4,251,133
[45] Feb. 17, 1981

[54] LARGE APERTURE TELEPHOTO-LENS
[75] Inventor: Sadahiko Tsuji, Yokohama, Japan
[73] Assignee: Canon Kabushiki Kaisha, Tokyo, Japan
[21] Appl. No.: 958,634
[22] Filed: Nov. 8, 1978
[30] Foreign Application Priority Data
Nov. 16, 1977 [JP] Japan .................................. 52-137674
[51] Int. Cl.³ ............................ G02B 9/62; G02B 9/60
[52] U.S. Cl. ..................................... 350/465; 350/464
[58] Field of Search ................ 350/215, 216, 176, 177
[56] References Cited

U.S. PATENT DOCUMENTS

| | | | |
|---|---|---|---|
| 4,045,128 | 8/1977 | Momiyama | 350/216 |
| 4,063,801 | 12/1977 | Yokota | 350/216 |
| 4,068,929 | 1/1978 | Yokota | 350/215 |
| 4,126,378 | 11/1978 | Ogino | 350/215 X |

Primary Examiner—Paul A. Sacher
Attorney, Agent, or Firm—Toren, McGeady and Stanger

[57] ABSTRACT

The present invention relates to a large aperture telephoto-lens consisting of a positive front lens group including a positive lens, a negative lens and a positive lens in sequence and a rear lens group arranged distant from the front group on the optical axis and including a fixed negative sub-group and a movable negative sub-group for focusing, whereby the following relations are satisfied.

$$47 > \frac{\nu_1 + \nu_3}{2} - \nu_2 > 36$$
$$1.15|R_3| > |R_2| > 1.04|R_3|, R_2 < 0, R_3 < 0$$
$$0.41f > |R_3| > 0.34f$$
$$0.31 > n_2 - \frac{n_1 + n_3}{2} > 0.22$$

Hereby, $\nu_1$, $\nu_2$, $\nu_3$ are Abbe's numbers of the lenses constituting the front lens group; $n_1$, $n_2$, $n_3$ are refractive indices of the lenses constituting the front lens group; $R_2$ is the radius of curvature of the image side surface of the object side positive lens in the front lens group; $R_3$ is the radius of curvature of the object side surface of the negative lens in the front lens group; and f is the focal length of the whole system when an object at the infinite distance is in focus.

4 Claims, 28 Drawing Figures

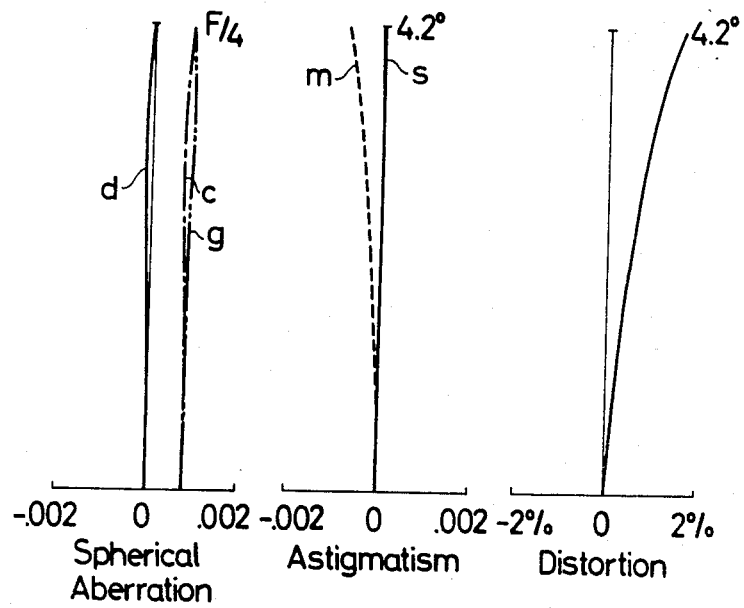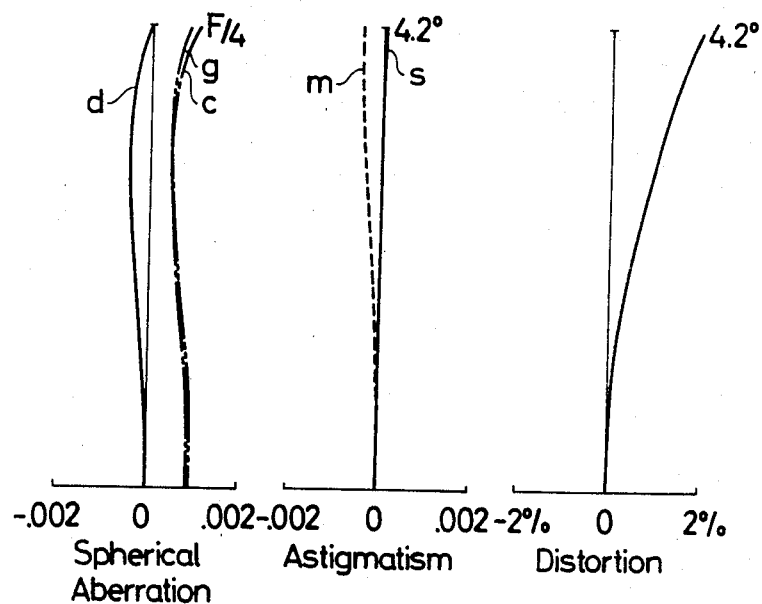

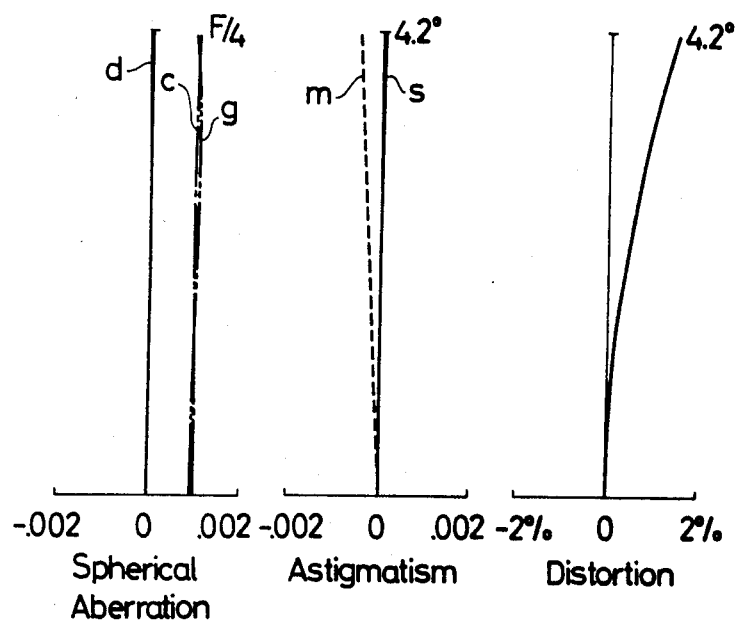
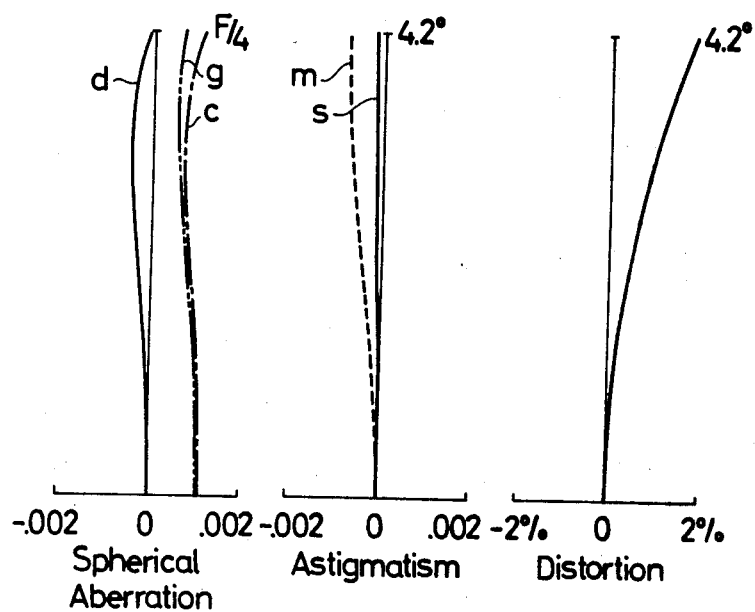

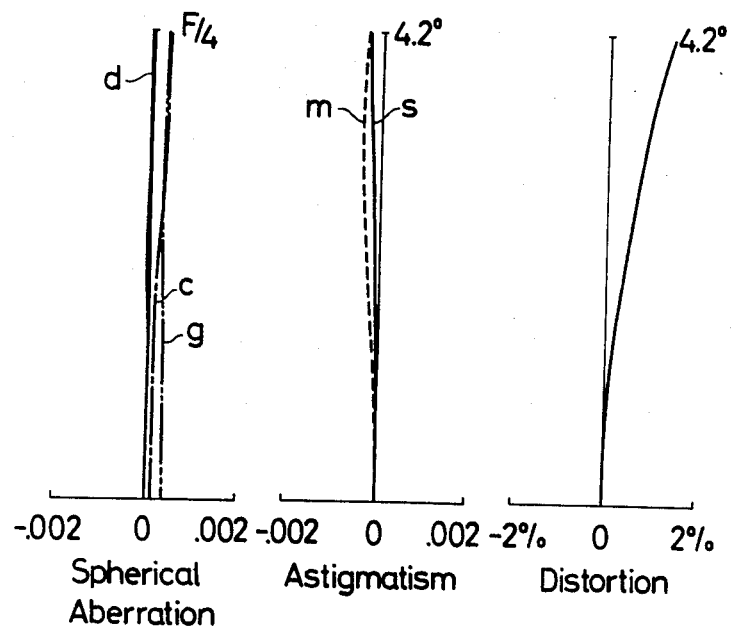
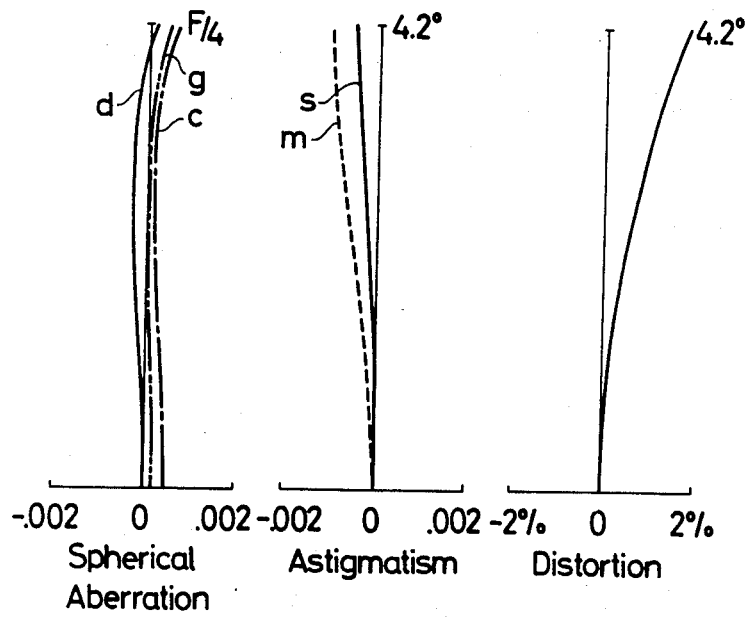

LARGE APERTURE TELEPHOTO-LENS

BACKGROUND OF THE INVENTION

The present invention relates to a telephoto-lens, particularly for focusing the whole system by moving a part of the rear lens group along the direction of the optical axis. A telephoto-lens so designed that the focusing is made by moving a movable lens group in the rear lens group having a negative refractive power instead of advancing the whole lens has been disclosed in U.S. Pat. No. 4,045,128. The telephoto-lens of this type has a lens barrel that is mechanically simple, light in weight and excellent in operability, while at the same time the compensation of aberrations is difficult because a part of the lens group is moved. Particularly, in the case of a large aperture lens, the aberration can not be corrected sufficiently. Hereby it is to be mentioned that the F-number of the examples of the lenses in the above mentioned patent is 1:4.5.

SUMMARY OF THE INVENTION

A purpose of the present invention is to offer a telephoto-lens so designed that the focusing is made by moving a part of the rear lens group members.

Another purpose of the present invention is to offer a telephoto-lens with large aperture.

Such a telephoto-lens consists of a front lens group having a positive refractive power and including a positive lens, a negative lens and a positive lens in sequence and a rear lens group having a negative refractive power and including a stationary sub-group and an axially movable sub-group, so designed that the focusing is made by moving a movable sub-group, whereby the following relations are satisfied:

$$47 > \frac{\nu_1 + \nu_3}{2} - \nu_2 > 36 \quad (1)$$
$$1.15|R_3| > |R_2| > 1.04|R_3|, R_2 < 0, R_3 < 0 \quad (2)$$
$$0.41f > |R_3| > 0.34f \quad (3)$$
$$0.31 > n_2 - \frac{n_1 + n_3}{2} > 0.22 \quad (4)$$

Hereby, $\nu_1, \nu_2, \nu_3$: Abbe's numbers of the lenses constituting the front lens group $n_1, n_2, n_3$: Refractive indices of the lenses constituting the front lens group $R_2$: Radius of curvature of the image side surface of the object side positive lens in the front lens group $R_3$: Radius of curvature of the object side surface of the negative lens in the front lens group.

f: Focal length of the whole system when an object at infinity is in focus.

BRIEF DESCRIPTION OF THE DRAWINGS

FIGS. 7A–7C show the diagram of the aberrations of the second example when an object at infinity is in focus.

FIGS. 8A–8C show the diagram of the aberrations of the second example when an object at the shortest distance is in focus.

FIGS. 9A–9C show the diagram of the aberrations of the third example when an object at infinity is in focus.

FIGS. 10A–10C show the diagram of the aberrations of the third example when an object at the shortest distance is in focus.

FIGS. 11A–11C show the diagram of the aberration of the fourth example when an object at infinity is in focus.

FIGS. 12A–12C show the diagram of the aberrations of the fourth example when an object at the shortest distance is in focus.

DETAILED EXPLANATION OF THE EMBODIMENTS

Figure 1:
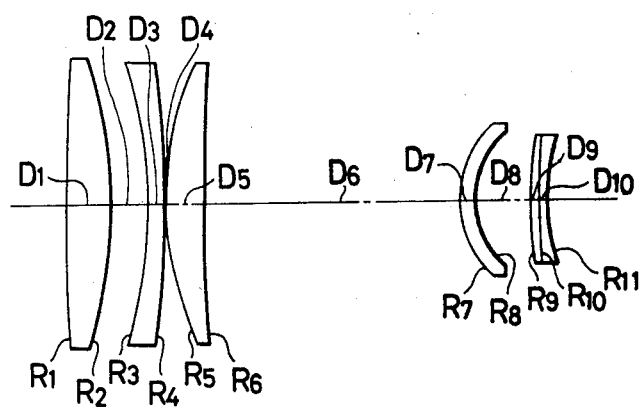
FIG. 1 shows the first example of the lens in accordance with the present invention in sectional view.

Below, the meaning of the relations (1)–(4) will be explained. The relation (1) is the condition for controlling the dispersion of the positive lens and the negative lens arranged in the front lens group, whereby by choosing a large difference between the Abbe's number of the positive lens and that of the negative lens the refractive power of the individual lens in the front lens group is weakened so as to prevent the growth of the aberrations of higher order in order to obtain a large aperture. As a consequence thereof, below the lower limit in the equation (1) the difference between the dispersions is so small that the refractive power of the individual lens becomes larger and therefore, the aberrations of higher order are apt to take place. On the other hand, above the upper limit the refractive power of the individual lens in the front lens group is so small that the spherical aberration can not be compensated sufficiently and the Petzval sum is small. Thus, a good image quality efficiency can not be obtained.

The relation (2) is the condition for mainly compensating the spherical aberration, whereby by setting the radius of curvature $R_1$ of the object side surface of the negative lens a little smaller than $R_2$ of the image side surface of the object side positive lens in the front lens group the spherical aberration is compensated. However, when the difference is too large beyond the lower limit the spherical aberration is over-corrected in such a manner that the aberrations of the whole system are out of balance, while when the difference is too small the spherical aberration is under-corrected in such a manner that when an attempt is made to compensate the spherical aberration with the lens group behind the front group not only the coma and the astigmatism becomes larger but also the variation of the aberrations in case of different object distance becomes large.

The relation (3) is the condition for obtaining a large aperture. Namely by chosing the radius of curvature of the object side surface of the negative lens in the front lens group comparatively large, the spherical aberration or the coma of higher order is made small. However, beyond the upper limit the spherical aberration as well as the coma are under-corrected. On the other hand, beyond the lower limit the aberrations of higher order are apt to take place and a large aperture is hard to obtain.

The relation (4) relates to the Petzval sum. Generally speaking it is desirable for the photographer that the total length of a telephoto-lens should be as small as possible, whereby the Petzval sum is apt to be negative. In order to prevent this it is effective to make the refractive index of the positive lens low and that of the negative lens high.

However, in case the difference between those refractive indices is large, the coloration of the glass material applicable to a negative lens within the range in which the relation (1) is satisfied becomes remarkable, so that the color contribution becomes yellowish. Thus, the upper limit stipulates the limit within which a relatively clear glass material can be applied to the negative lens, while the lower limit is for holding an optimum Petzval sum, whereby below this lower limit the influence upon the efficiency can not be disregarded.

Below some numerical examples are given, whereby the front lens group consists of a bi-convex lens, a negative meniscus lens with a concave surface at the object side and a bi-convex or a positive meniscus lens, while a negative lens group consists of a negative meniscus lens with a convex surface at the object side and a lens consisting of a positive and a negative lens cemented on each other or separated from each other. Hereby the nearer the object is, the more the negative compound lens is brought toward the object for focusing.

In the following numerical data, R is the radius of curvature, D is the lens thickness or the air gap, n is the refractive index for d-line and ν is the Abbe's number.

Numerical Example 1

Figure 2:
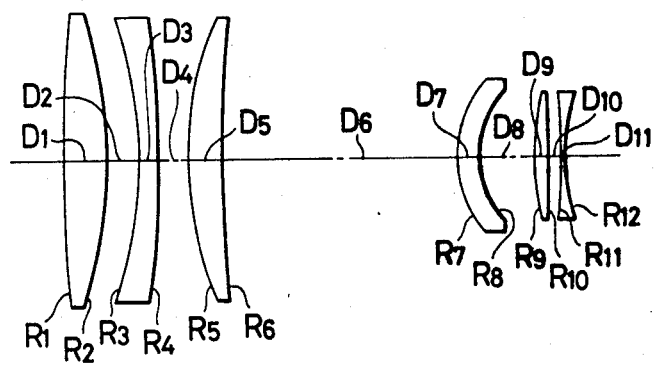
FIG. 2 shows the second example in the sectional view.
Figures 5A, 5B, 5C:
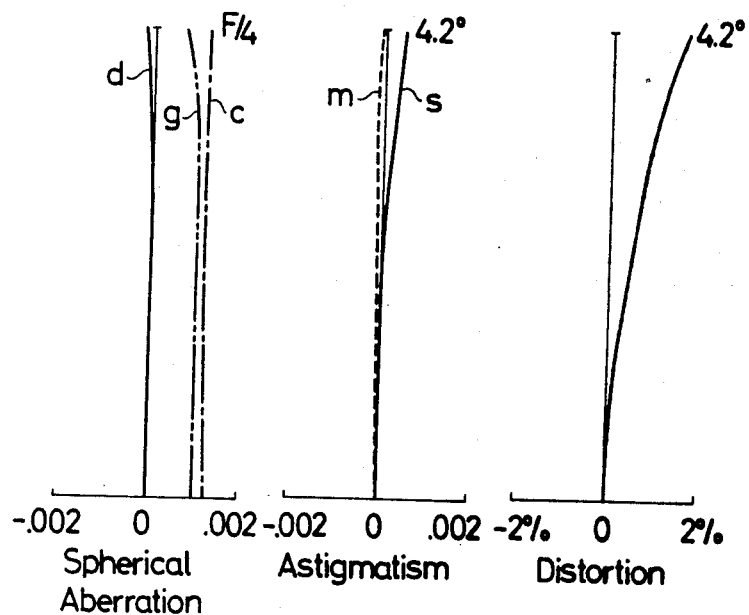
FIGS. 5A–5C show the diagrams of the aberration of the first example when an object at infinity is in focus.
Figures 6A, 6B, 6C:
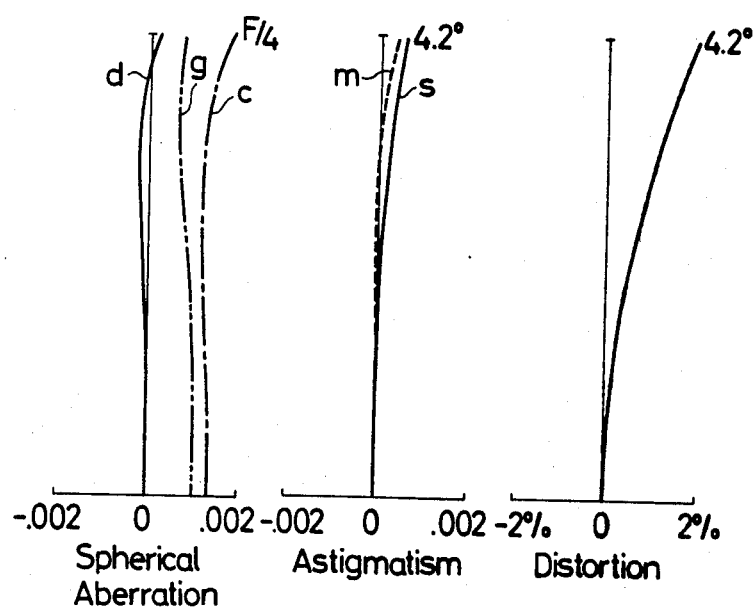
FIGS. 6A–6C show the diagram of the aberrations of the first example when an object at the shortest distance is in focus.

(The lens corresponds to that shown in FIG. 2, FIG. 5 shows the spherical aberration, the astigmatism and the distortion when an object at the infinite distance is in focus. FIG. 6 shows the aberration when an object at the distance of $10f$ is in focus.)

| $f = 1$ | F-Number = 1:4 | Diaphragm behind $r_8$ by 0.0473 | |
|---|---|---|---|
| $R_1 = 2.1419$ | $D_1 = 0.0374$ | $n_1 = 1.51633$ | $\nu_1 = 64.1$ |
| $R_2 = -0.3945$ | $D_2 = 0.0319$ | | |
| $R_3 = -0.3455$ | $D_3 = 0.0152$ | $n_2 = 1.75520$ | $\nu_2 = 27.5$ |
| $R_4 = -0.8908$ | $D_4 = 0.0011$ | | |
| $R_5 = 0.2990$ | $D_5 = 0.0327$ | $n_3 = 1.51633$ | $\nu_3 = 64.1$ |
| $R_6 = 2.8154$ | $D_6 = 0.2173$ | | |
| $R_7 = 0.0879$ | $D_7 = 0.0117$ | $n_4 = 1.58913$ | $\nu_4 = 61.1$ |
| $R_8 = 0.0795$ | $D_8 = 0.0507$ | | |
| $R_9 = 0.3460$ | $D_9 = 0.0075$ | $n_5 = 1.75520$ | $\nu_5 = 27.5$ |
| $R_{10} = 1.0317$ | $D_{10} = 0.0061$ | $n_6 = 1.71300$ | $\nu_6 = 53.9$ |
| $R_{11} = 0.1777$ | | | | b.f.(Back focal distance) = 0.3829

Numerical Example 2

(The lens corresponds to that shown in FIG. 1, FIG. 7 shows the aberrations when an object at the infinite distance is in focus. FIG. 10 shows the aberrations when an object at the distance of $10f$ is in focus.)

| $f = 1$ | F-Number = 1:4 | Diaphragm behind $r_8$ by 0.041 | |
|---|---|---|---|
| $R_1 = 1.5189$ | $D_1 = 0.0366$ | $n_1 = 1.48749$ | $\nu_1 = 70.1$ |
| $R_2 = -0.4013$ | $D_2 = 0.0266$ | | |
| $R_3 = -0.3647$ | $D_3 = 0.0169$ | $n_2 = 1.72151$ | $\nu_2 = 29.2$ |
| $R_4 = -0.8800$ | $D_4 = 0.0257$ | | |
| $R_5 = 0.2872$ | $D_5 = 0.0297$ | $n_3 = 1.49700$ | $\nu_3 = 81.3$ |
| $R_6 = 1.2195$ | $D_6 = 0.2001$ | | |
| $R_7 = 0.0922$ | $D_7 = 0.0153$ | $n_4 = 1.58913$ | $\nu_4 = 61.1$ |
| $R_8 = 0.0821$ | $D_8 = 0.0510$ | | |
| $R_9 = 0.2537$ | $D_9 = 0.0118$ | $n_5 = 1.59270$ | $\nu_5 = 35.3$ |
| $R_{10} = -1.1778$ | $D_{10} = 0.0080$ | | |
| $R_{11} = -1.4283$ | $D_{11} = 0.0055$ | $n_6 = 1.77250$ | $\nu_6 = 49.6$ |
| $R_{12} = 0.1816$ | | | | b.f. = 0.3806

Numerical Example 3

Figure 3:
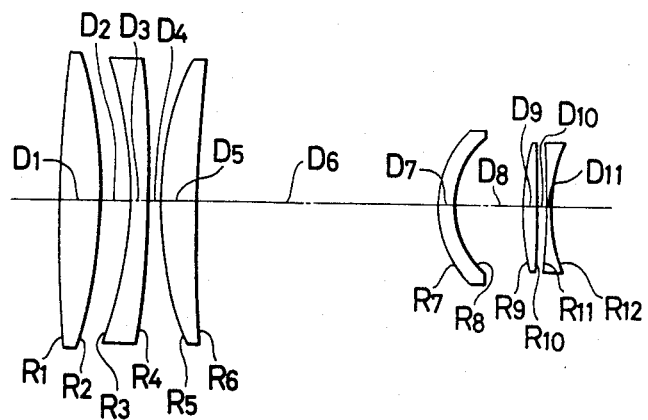
FIG. 3 shows the third example in the sectional view.

(The lens corresponds to that shown in FIG. 3. FIG. 9 shows the aberration when an object at the infinite distance is in focus. FIG. 10 shows the aberration when an object at the distance of $10f$ is in focus.)

| $f = 1$ | F-Number = 1:4 | Diaphragm behind $r_8$ by 0.0532 | |
|---|---|---|---|
| $R_1 = 1.4814$ | $D_1 = 0.0355$ | $n_1 = 1.48749$ | $\nu_1 = 70.1$ |
| $R_2 = -0.3990$ | $D_2 = 0.0237$ | | |
| $R_3 = -0.3671$ | $D_3 = 0.0169$ | $n_2 = 1.72151$ | $\nu_2 = 29.2$ |
| $R_4 = -0.9852$ | $D_4 = 0.0102$ | | |
| $R_5 = 0.3061$ | $D_5 = 0.0308$ | $n_3 = 1.48749$ | $\nu_3 = 70.1$ |
| $R_6 = 1.8594$ | $D_6 = 0.2064$ | | |
| $R_7 = 0.0927$ | $D_7 = 0.0150$ | $n_4 = 1.58913$ | $\nu_4 = 61.1$ |
| $R_8 = 0.0832$ | $D_8 = 0.0575$ | | |
| $R_9 = 0.2530$ | $D_9 = 0.0122$ | $n_5 = 1.59270$ | $\nu_5 = 35.3$ |
| $R_{10} = -1.8594$ | $D_{10} = 0.0068$ | | |
| $R_{11} = -2.8871$ | $D_{11} = 0.0057$ | $n_6 = 1.77250$ | $\nu_6 = 49.6$ |
| $R_{12} = 0.1843$ | | | | b.f. = 0.3883

Numerical Example 4

Figure 4:
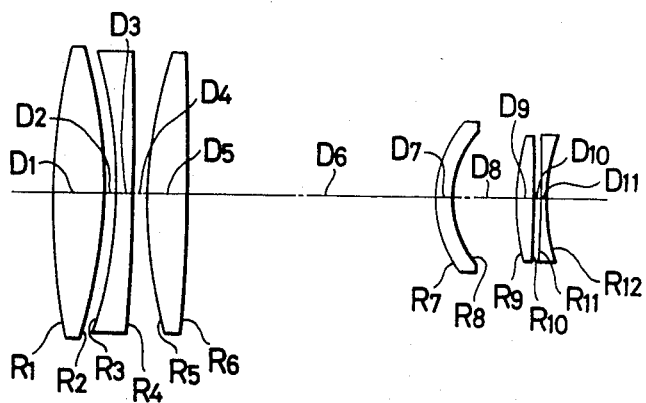
FIG. 4 shows the fourth example in the sectional view.

(The lens corresponds to that shown in FIG. 4. FIG. 11 shows the aberrations when an object at the infinite distance is in focus. FIG. 12 shows the aberrations when an object at the distance of $10f$ is in focus.)

| $f = 1$ | F-Number = 1:4 | Diaphragm behind $r_8$ by 0.0502 | |
|---|---|---|---|
| $R_1 = 0.6209$ | $D_1 = 0.0409$ | $n_1 = 1.49700$ | $\nu_1 = 81.3$ |
| $R_2 = -0.4220$ | $D_2 = 0.0115$ | | |
| $R_3 = -0.4043$ | $D_3 = 0.0142$ | $n_2 = 1.80610$ | $\nu_2 = 40.9$ |
| $R_4 = -3.6564$ | $D_4 = 0.0129$ | | |
| $R_5 = 0.4075$ | $D_5 = 0.0335$ | $n_3 = 1.49700$ | $\nu_3 = 81.3$ |
| $R_6 = -2.0231$ | $D_6 = 0.2101$ | | |
| $R_7 = 0.0969$ | $D_7 = 0.0149$ | $n_4 = 1.58913$ | $\nu_4 = 61.1$ |
| $R_8 = 0.0872$ | $D_8 = 0.0575$ | | |
| $R_9 = 0.2531$ | $D_9 = 0.0122$ | $n_5 = 1.59270$ | $\nu_5 = 35.3$ |
| $R_{10} = -1.8597$ | $D_{10} = 0.0068$ | | |
| $R_{11} = -2.8875$ | $D_{11} = 0.0058$ | $n_6 = 1.77250$ | $\nu_6 = 49.6$ |
| $R_{12} = 0.1843$ | | | |

| | Ex. 1 | Ex. 2 | Ex. 3 | Ex. 4 |
|---|---|---|---|---|
| $\dfrac{\nu_1 + \nu_3}{2} - \nu_2$ | 36.6 | 46.65 | 40.9 | 40.4 |
| $\dfrac{R_2}{R_3}$ | 1.142 | 1.100 | 1.087 | 1.0437 |
| $n_2 - \dfrac{n_1 + n_3}{2}$ | 0.23887 | 0.22927 | 0.23402 | 0.3091 | b.f. = 0.3884

What is claimed is:

1. A large aperture telephoto-lens comprising, a front lens group having a positive power and remaining stationary during focusing, said front lens group consisting of a positive, a negative and a positive lenses in said order; a rear lens group having a negative power and including a stationary sub-group and a movable sub-group, said movable sub-group being axially movable to effect focusing of the telephoto-lens to suit differing object distance; and wherein $$47 > \frac{\nu_1 + \nu_3}{2} - \nu_2 > 36$$

-continued $1.15|R_3| > |R_2| > 1.04|R_3|, R_2 < 0, R_3 < 0$
$0.41f > |R_3| > 0.34f$
$0.31 > n_2 - \frac{n_1 + n_3}{2} > 0.22$ where $\nu_1, \nu_2, \nu_3$: Abbe's numbers of the lenses constituting the front lens group.

$n_1, n_2, n_3$: Refractive index of the lenses constituting the front lens group.

$R_2$: Radius of curvature of the image side surface of the object side positive lens in the front lens group.

$R_3$: Radius of curvature of the object side surface of the negative lens in the front lens group.

f: Focal length of the whole system where an object at the infinite distance is in focus.

2. A large aperture telephoto-lens in accordance with claim 1, wherein the movable sub-group includes a positive and a negative lens, the first lens surface being convex toward the object and the last lens surface being concave toward the image.

3. A large aperture telephoto-lens in accordance with claim 2, wherein the movable sub-group has a negative refractive power.

4. A large aperture telephoto-lens in accordance with claim 1, wherein the stationary sub-group has a negative refractive power and is arranged closer to the object than the movable sub-group.

* * * * *